United States Patent Office 3,380,003
Patented Apr. 23, 1968

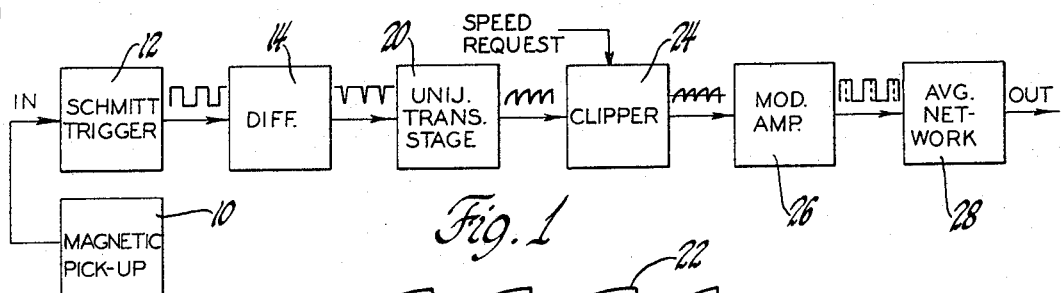
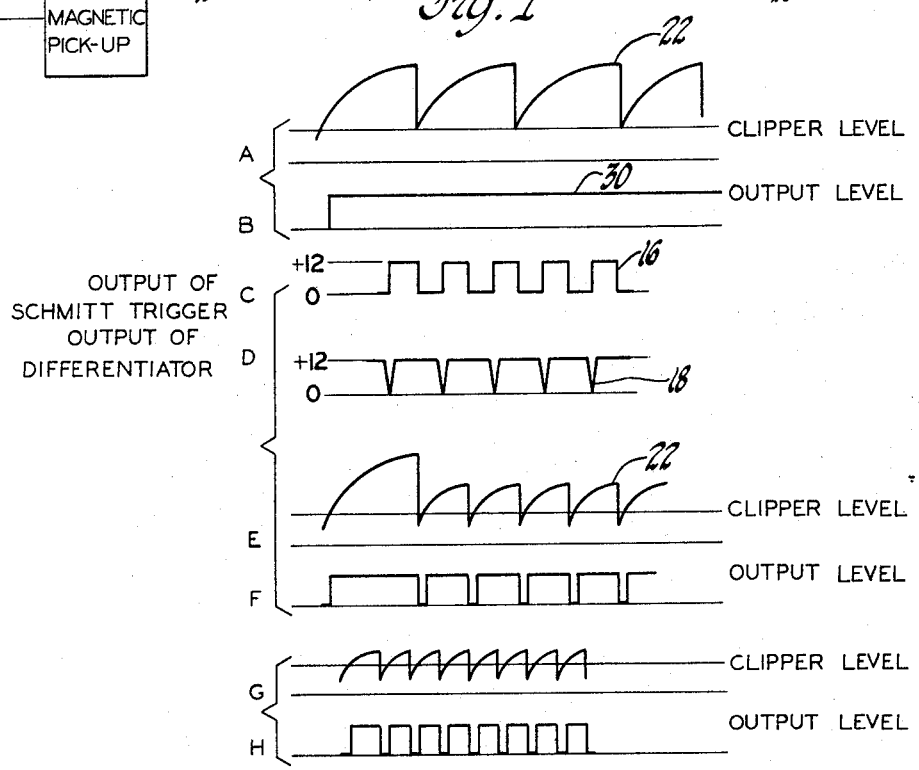
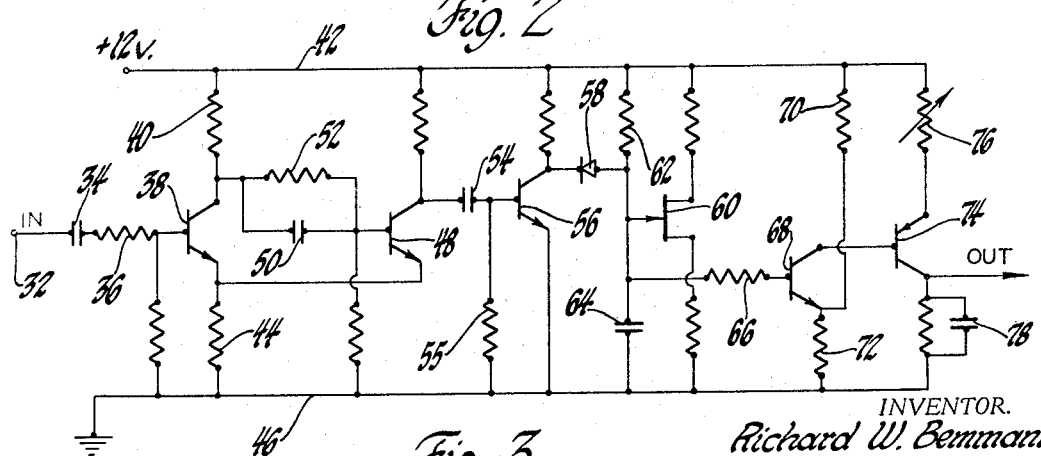

3,380,003
SIGNAL FREQUENCY TO PULSE WIDTH
MODULATION CONVERTER
Richard W. Bemmann, Flint, Mich., assignor to General
Motors Corporation, Detroit, Mich., a corporation of
Delaware
Filed Feb. 25, 1965, Ser. No. 435,315
5 Claims. (Cl. 332—9)

ABSTRACT OF THE DISCLOSURE

A frequency to amplitude converter including a sawtooth waveform generator the output of which is reset to a minimum value at the frequency of an input signal, and a clipper circuit which responds to the portion of the sawtooth which exceeds a predetermined value. A filter may be added to smooth the output of the clipper.

Summary of the invention

This invention relates to aparatus for converting a variable frequency input signal into width modulated signal pulses wherein the width of the pulses is related to the frequency of the input signal. This apparatus may be particularly useful in monitoring or regulating the frequency of the occurrence of a particular event such as the revolution of a flywheel or output shaft.

There are many instances where it is desirable to produce DC pulses which are modulated in width in accordance with the relatively slowly varying characteristics of a quantity or event being monitored or regulated. For example, in the control of the speed of internal combustion engines, it may be desirable to monitor the amount of fuel which is introduced into the engine in accordance with the speed thereof. The patent to Fales 3,070,185, issued Dec. 25, 1962, and assigned to the General Motors Corporation, discloses an electronic apparatus which may be employed in engine throttle control systems.

In this apparatus a relatively slowly varying signal quantity such as a DC voltage is produced with a magnitude proportional to actual engine speed. This signal quantity is compared with a desired speed signal and the result thereof is added to a relatively rapidly varying signal quantity in the form of an AC voltage. This combination is applied to a triggering apparatus which is responsive to signals in excess of a predetermined signal level to produce a substantially constant amplitude output signal. Hence, as the relatively slowly varying quantity proportional to actual speed varies over a certain range, the portion of the sum signal which exceeds the predetermined value will vary thereby to produce width modulated pulses from the output.

In accordance with the present invention, width modulated pulses may be produced which are related in width to the frequency of an input signal which may, for example, be provided through suitable means by the rotation of an engine part. The invention may comprise the combination of means for producing control pulses at a frequency which is related to the frequency of the input signal, means for producing a first output voltage which increases in magnitude from a minimum value as a function of time, and means for employing the control pulses in a manner tending to reset the first output voltage to the minimum value upon the occurrence of each of the control pulses. Through this combination, the first output voltage is caused to assume a generally sawtooth waveform with the frequency of the returns in the waveform from the increased value to the minimum value being dependent, at least in part, upon the rate of occurrence of the control pulses. By applying this sawtooth waveform to trigger means which is responsive to a voltage in excess of a predetermined reference value to produce a second output voltage of substantially constant amplitude, it can be seen that the output of the trigger means will be a series of width modulated pulses, the width modulation being controlled by the frequency of occurrence of said control pulses. In the event a smooth DC signal output is desired, filter means may be added to the above-defined combination to produce a DC output voltage which is proportional to the average value of the width modulated pulses.

Having described the invention in general, a specific embodiment thereof will be described in the following specification which is to be taken with the accompanying drawings of which:

FIGURE 1 is a block diagram of a specific embodiment of the invention;

FIGURE 2 is a set of waveforms illustrating the operation of the specific embodiment of the invention; and FIGURE 3 is a suggested schematic diagram of the specific embodiment of the invention.

In the embodiment shown in the drawings, the objective which is accomplished is the conversion of a variable frequency input signal into a train of voltage pulses of substantially constant amplitude but varying in width in proportion to the frequency of the input signal. The input signal may be of sinusoidal waveform and may vary in amplitude at a frequency which corresponds to the rate of rotation of an engine part. Referring specifically to FIGURE 1, the input signals may be generated by a magnetic pickup 10 which may, for example, take the form of a coil wrapped around an iron core and supplied with electrical energy and located adjacent a wheel having peripheral teeth such that passage of the teeth past the coil produces voltage of substantially sinusoidal waveform. The frequency of the voltage corresponds with the rate of rotation of the wheel. This input signal must be shaped into control pulses compatible with the embodiment of the invention. This is accomplished by means of the combination of a Schmitt trigger circuit 12 and a differentiating circuit 14. The Schmitt trigger circuit 12 converts the sinusoidal input signal into a square wave train 16 shown on line C of FIGURE 2 thereby eliminating the effects of any amplitude variation in the input signal. This square wave train from the output of the Schmitt trigger circuit 12 is applied to the input of the differentiating circuit 14 which effectively differentiates the wave train 16 to provide a series of negative voltage pulses 18 shown on line D of FIGURE 2. These pulses 18 serve a control function with respect to transistor stage 20 as described below.

The voltage pulses 18 obviously occur at a frequency which is related to the frequency of the input signals from the magnetic pickup 10 and are referred to as control pulses in this specification. The pulses 18 are applied to the input of a unijunction transistor stage 20, which, as will become more apparent in the following, functions as a resettable oscillator which normally produces a sawtooth voltage waveform 22 at a predetermined free running frequency which may be set by a tuning circuit within the oscillator stage 20. This sawtooth waveform 22, as shown on lines A and E of FIGURE 2, includes a portion which normally increases as an exponential function of time from a predetermined minimum voltage value and periodically drops substantially instantaneously back to the minimum value after having attained a predetermined maximum value. The unijunction transistor stage 20, while normally operating at a relatively low free running frequency, is responsive to the pulses 18 or at least to the pulses of one specific polarity to be reset upon the occurrence of a control pulse such that the sawtooth waveform 22 returns to the minimum voltage value upon the occurrence of each pulse 18 irrespective of the normal free running periodicity of the unijunction transistor stage 20. Accordingly, the output of the stage 20 is a sawtooth voltage waveform, the frequency and maximum amplitude, and therefore average value of which is regulated by the frequency of the control pulses 18. This waveform is applied to a clipper circuit 24 which removes that portion of each of the sawtooth pulses which does not exceed a predetermined reference value. This reference value is set so as to be greater than the predetermined minimum value of the sawtooth exponential pulses but less than the maximum value. The remaining positive portions of the exponential pulses in the sawtooth waveform 22 are applied to a modulation amplifier 26 which functions to produce voltage pulses of substantially constant amplitude but of a width which varies in accordance with the width of the portion of the sawtooth pulses which exceed the reference level of the clipper 24. Accordingly the overall objective of the specific embodiment of the invention shown in FIGURE 1 is accomplished.

If it is desired to produce an output signal in the form of a DC voltage which is related in magnitude to the frequency of the input signal from the magnetic pickup 10, an averaging network 28 in the form of an RC filter circuit may be provided to receive the width modulated pulses from the amplifier 26. This filter is effective to smooth out the width modulated pulses and to produce a DC output signal which is related in amplitude to the average value of the width modulated pulses.

Briefly discussing the operation of the converter apparatus described herein, lines A and B of FIGURE 2 illustrate the condition which obtains when no input signal is received from the magnetic pickup 10. Under these conditions the unijunction transistor stage 20 functions in the free running oscillator mode to produce a sawtooth voltage waveform 22 which, at all times, exceeds the reference or triggering level of the clipper circuit 24. Accordingly modulation amplifier 26 receives an input signal which is of positive polarity in this particular example. Thus the modulation amplifier 26 produces a DC signal 30 of constant amplitude which is, of course reproduced by the averaging network 28.

Upon the occurrence of a signal from the magnetic pickup 10, the Schmitt trigger circuit 12 reproduces a square wave signal 16 shown on line C of FIGURE 2 which, as previously stated, renders the signal insensitive to amplitude variations in the input signal. The square waveform is differentiated at 14 to produce the series of negative control pulses 18 shown on line D of FIGURE 2. These control pulses are applied to the unijunction transistor stage 20 to reset the oscillator portion of the unijunction transistor stage such that the output is returned to the predetermined minimum value upon the occurrence of each of the positive control pulses 18. This reset function overrides the normal free running function of the transistor stage whenever the frequency of the control pulses 18 is equal to or exceeds the free running frequency of the transistor stage. For input signals, and hence control pulse frequencies, which are lower than the free running frequency of the transistor stage, the output is reset to the minimum value upon the occurrence of the pulses; however, these pulses occurring at a lower frequency than the normal resetting function do not substantially reduce the average value of the output thereof. Accordingly the fine proportional control is accomplished whenever the input signal frequency, and hence the control pulse frequency, exceeds that of the normal free running frequency. As shown on line E of FIGURE 2, the sawtooth pulses are reduced to a value less than the clipper level upon the occurrence of each of the negative control pulses 18. The width of the output pulses from the modulation amplifier 26 shown on line F of FIGURE 2 corresponds in width to that portion of each of the exponential sawtooth pulses in waveform 22 which exceeds the clipper level. Accordingly the width of the pulses from the modulation amplifier 26 appearing on line F is modulated by the input signals from the magnetic pickup 10.

Looking to lines G and H of FIGURE 2, the condition of a relatively high input signal frequency is illustrated. Under high frequency conditions the exponential sawtooth waveform is rapidly reset to the minimum level such that only a small portion of each pulse exceeds the clipper level. Accordingly only that portion of the pulses which does exceed the clipper level is effective to produce positive constant amplitude pulses from the modulation amplifier 26, as shown on line H.

FIGURE 3 is a schematic diagram of the specific embodiment of the invention shown in FIGURE 1 exclusive of the magnetic pickup 10. It is assumed in FIGURE 3 that an input signal which varies in amplitude in accordance with the frequency of occurrence of an event is applied to the input terminal 32, and hence by a capacitor 34 and resistor 36, to the input of a Schmitt trigger stage which includes an N-P-N transistor 38. The collector of the transistor 38 is connected through a resistor 40 to a 12-volt supply source which is connected to a line 42. The emitter of the transistor 38 is connected via a resistor 44 to a grounded line 46. The Schmitt trigger circuit also includes a second N-P-N transistor 48 having the input or base electrode thereof coupled with the collector of transistor 38 via the parallel combination of a capacitor 50 and resistor 52. The emitter of transistor 48 is commonly connected with the emitter of transistor 38 and the collector of transistor 48 is connected to line 42. The output of transistor 48 in the Schmitt trigger circuit is connected to a differentiating circuit comprising a capacitor 54 and a resistor 55. This differentiating circuit is in turn coupled to an amplifying transistor 56 having the emitter grounded and the collector connected to line 42. The output of transistor 56 which comprises the negative voltage spikes shown on line D of FIGURE 2 is connected through a diode 58 to the input of a unijunction transistor stage comprising a unijunction transistor 60. The diode 58 is effective to block the 12-volt supply and pass only the negative going voltage pulses in the waveform of line D, FIGURE 2.

As previously mentioned, the unijunction transistor stage functions as a free running oscillator, the frequency of which is determined by the combination of a resistor 62 and a capacitor 64 which are connected in series between lines 42 and 46 as shown. The charge on capacitor 64 normally builds up exponentially as demonstrated in FIGURE 2 until it is effective to fire the unijunction transistor 60 substantially discharging the capacitor and returning the output level of the unijunction transistor stage to a free running minimum voltage level as shown on line A of FIGURE 2. However, upon the occurrence of a negative control pulse 18 from the differentiating circuit including transistor 56, the unijunction transistor is immediately fired thereby discharging capacitor 64 irrespective of the normal periodicity of the functioning of the astable oscillator to produce the sawtooth modulation previously described. The signal from the upper plate of capacitor 64 is communicated by a resistor 66 to the base or input electrode of a transistor 68 which constitutes the clipper circuit. The emitter of transistor 68 is commonly connected via respective resistors 70 and 72 to lines 42 and 46 as shown. The collector of transistor 68 is connected to the base or input electrode of a P-N-P transistor 74 which functions as a modulation amplifier. The transistor 74 has the emitter thereof connected through a variable resistor 76 to line 42 and the collector thereof connected through an RC filter circuit or averaging network 78 which functions to provide an output signal corresponding to the average value of the width modulated pulses from transistor 74.

It may be particularly advantageous to employ the embodiment of the invention described above in a governing system; for example, in a turbine engine. In this case the input signal from the magnetic pickup 10 would correspond to the speed of the turbine engine drive stage and the output signal could be employed to operate a solenoid type fuel valve thereby to monitor the quantity of fuel introduced into the engine. Of course, these circuits could also be used in a simple speed monitoring mode without the fuel control feedback feature. In addition, it may be desirable to be able to set the clipper level at any amplitude within a particular range of amplitudes in order to provide a range of possible engine speeds when the system is operated in a feedback or fuel control mode. In this event, means may be employed as suggested in FIGURE 1 to set the clipper level at a desired speed which would then be maintained by the conversion apparatus described.

It is to be understood that the detailed description given above applies to only an illustrative embodiment of the invention and is not to be construed in a limiting sense. For a definition of the invention reference should be had to the appended claims.

I claim:

1. Apparatus for producing signal pulses related in width to the frequency of an input signal comprising first means for receiving the input signal and responsive thereto to produce control pulses at a frequency related to the frequency of the input signal, second means having an input and an output for producing a first output voltage on said output which gradually increases in magnitude from a minimum value as a function of time, said second means being responsive to said control pulses applied to said input for resetting the output of said second means to said minimum value, third means connecting said control pulses to said input, and fourth means for producing a second output voltage of substantially constant amplitude upon receipt of a voltage exceeding a predetermined reference value, the fourth means being connected to receive the first output voltage, the predetermined reference value being greater than said minimum value.

2. Apparatus for producing a DC voltage which is related in magnitude to the frequency of an input signal comprising first means for receiving the input signal and responsive thereto to produce control pulses at a frequency related to the frequency of the input signal, second means having an input and an output for producing a first output voltage on said output which gradually increases in magnitude from a minimum value as a function of time, said second means being responsive to said control pulses applied to said input for resetting the output of said second means to said minimum value, third means connecting said control pulses to said input, fourth means for producing a second output voltage of substantially constant amplitude upon receipt of a voltage exceeding a predetermined reference value, the fourth means being connected to receive the first output voltage, the predetermined reference value being greater than said minimum value, and filter means connected to receive the second output voltage and to produce a DC voltage related in magnitude to the average value thereof.

3. Apparatus for producing signal pulses related in width to the frequency of an input signal comprising first means for receiving the input signal and responsive thereto to produce control pulses at a frequency related to the frequency of the input signal, second means having an input and an output for periodically producing a first output voltage on said output which gradually increases in magnitude from a minimum value as a function of time, said second means being connected to receive and responsive to said control pulses applied to said input for resetting the output of said second means to the minimum value, third means connecting said control pulses to said input, and fourth means for producing a second output voltage of substantially constant amplitude upon receipt of a voltage exceeding a predetermined reference value, the fourth means being connected to receive the first output voltage, the predetermined reference value being greater than said minimum value.

4. Apparatus as defined in claim 3, the combination further comprising filter means connected to receive the second output voltage and to produce a DC voltage related in magnitude to the average value thereof.

5. Apparatus for producing signal pulses related in width to the frequency of an input signal comprising trigger means for receiving the input signal and for producing a square wave voltage at a frequency corresponding to the frequency of the input signal, differentiating means connected to receive the square wave voltage and to differentiate said voltage to produce control pulses at a frequency related to the frequency of the input signal, pulse-resettable oscillator means having an output and including capacitive tuning means for producing a sawtooth voltage waveform which periodically increases in magnitude from a minimum value, means for applying said control pulses to the oscillator means for resetting the output thereof to said minimum value upon the occurrence of a control pulse irrespective of the normal periodicity of the sawtooth voltage waveform, and means for producing an output voltage of substantially constant amplitude upon receipt of a voltage exceeding a predetermined reference value, the last mentioned means being connected to receive the sawtooth voltage waveform, the predetermined reference value being greater than the said minimum value.

References Cited

UNITED STATES PATENTS 3,114,114  12/1963  Atherton et al. _____ 332—14 X
3,214,708  10/1965  Chamberlain _____ 332—14

FOREIGN PATENTS 628,555  8/1949  Great Britain.

ALFRED L. BRODY, *Primary Examiner.*